United States Patent
Weischedel

(10) Patent No.: US 6,296,284 B1
(45) Date of Patent: Oct. 2, 2001

(54) HOUSING OF A HEATING OR AIR-CONDITIONING SYSTEM OF A MOTOR VEHICLE AND METHOD THEREOF

(75) Inventor: Rolf Weischedel, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/368,163

(22) Filed: Aug. 5, 1999

(30) Foreign Application Priority Data

Aug. 5, 1998 (DE) .............................................. 198 35 287

(51) Int. Cl.[7] ....................................................... F16L 19/02
(52) U.S. Cl. ........................... 285/325; 285/67; 220/4.24; 220/345.3
(58) Field of Search ................. 285/325, 67; 220/4.24, 220/4.21, 345.2, 345.3, 345.4

(56) References Cited

U.S. PATENT DOCUMENTS

| | | | | |
|---|---|---|---|---|
| 348,556 | * | 9/1886 | Grueninger | 285/67 |
| 656,956 | * | 8/1900 | Eibee | 285/325 |
| 749,496 | * | 1/1904 | Patterson et al. | 285/67 |
| 760,424 | * | 5/1904 | Churchill | 285/67 |
| 1,853,578 | * | 4/1932 | Ross | 285/325 |
| 3,260,539 | * | 7/1966 | Herron | 285/67 |
| 3,362,564 | * | 1/1968 | Mueller | 220/345.4 X |
| 4,688,023 | * | 8/1987 | McGill et al. | 220/345.4 X |
| 5,383,691 | * | 1/1995 | Anthony | 285/325 |
| 5,788,109 | * | 8/1998 | Borghini | 220/345.3 |
| 6,019,219 | * | 2/2000 | Takahashi | 206/387.1 |

FOREIGN PATENT DOCUMENTS 40 21 460  1/1992 (DE) .
94 20 291  11/1995 (DE) .

* cited by examiner

*Primary Examiner*—Teri Pham Luu
(74) *Attorney, Agent, or Firm*—Foley & Lardner

(57) ABSTRACT

A housing and a housing assembly method of a heating or air-conditioning system of a motor vehicle has at least two housing parts that can be sealingly connected to one another along their separating plane. The peripheries of each housing part has a tongue and groove connecting members. The two housing parts are held together with the tongue and groove connecting members by displacing the two housing parts linearly relative to one another along the separating plane so that the tongue and groove formed around the peripheries of the two housing parts sealingly connect together. Locks or latches are provided in the tongue and groove connection to prevent the housing parts from inadvertently displacing along the separating plane.

19 Claims, 2 Drawing Sheets

HOUSING OF A HEATING OR AIR-CONDITIONING SYSTEM OF A MOTOR VEHICLE AND METHOD THEREOF

BACKGROUND

German Utility Model DE 94 20 291 discloses a housing of a heating and air-conditioning system of a motor vehicle, where two housing parts are connected to one another in a sealing manner along a separating plane using a tongue and groove connection. The tongues and grooves of the housing are designed to latch together. Although a latching connection of this type largely aids assembly, it cannot be effectively used for housings of heating or air-conditioning systems of motor vehicles because connections of this type can be released by straightforward tensile loading.

Accordingly, the housing parts of current heating or air-conditioning systems are screwed to one another or requires spring clips, as described for example in DE 94 20 291. Connections of this type, however, are disadvantageous in that they involve very high outlay and take a considerable amount of time to assemble, consequently increasing costs.

SUMMARY OF THE INVENTION

The present invention relates to a housing for a heating or air-conditioning system of an automotive vehicle and a method of assembling the housing. The present housing can be assembled cost-effectively while firmly and sealingly connecting the housing parts.

The housing has at least two housing parts, first and second housing parts. The first housing part has a first attaching member along a first portion of its periphery and a second attaching member along a second portion of its periphery. The second housing part has a third attaching member along a third portion of its periphery and a fourth attaching member along a fourth portion of its periphery.

The peripheries of the first and second housing parts are sealingly connected to one another along a plane that separates the first and second housing parts. The first attaching member is attach to the third attaching member and the second attaching member is attach to the fourth attaching member by displacing the first and second housing parts linearly along the separating plane.

The first and fourth attaching members each can comprise a tongue and the second and third attaching members each can comprise a groove to form at least two opposing tongue and groove connections. The grooves can be formed along the separating plane. The groove and the tongue of each of the first and second housing part can extend less than half of the periphery thereof.

Latches that prevent the first and second housing parts from displacing along the separating plane can be included. The latches can be provided on the first, second, third, and fourth attaching members. Each of the latches can comprise a latching lug formed on one of the first and third attaching members and one of the second and fourth attaching members, and a latching opening formed in the other of the first and third attaching members and the other of the second and fourth attaching members. The groove can have the latching openings and the tongue can have the latching lugs.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION OF THE PREFERRED EMBODIMENTS

Figure 1:
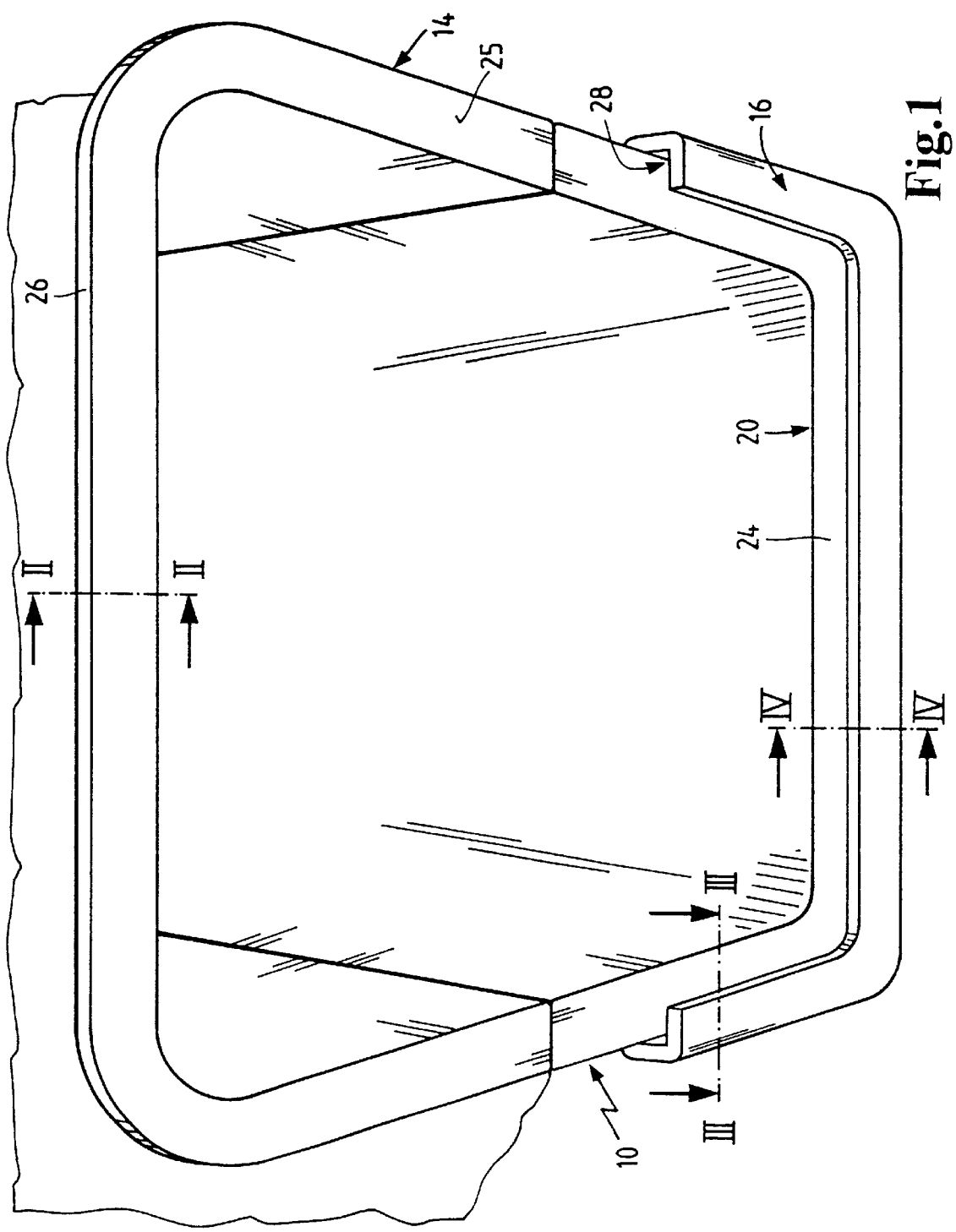
FIG. 1 shows a perspective view of a first housing part according to the invention.

A housing according to the invention of a heating or air-conditioning system of a motor vehicle comprises at least two housing parts 10 and 12. The perspective view of the first housing part 10 is illustrated in FIG. 1. The first housing part 10 can be, for example, an air-distributing housing of an air-conditioning system. The first housing part can be constructed of a top housing half 14 and a bottom housing half 16 joined together by conventional means, such as by welding, bonding, etc. The second housing part 12 can be, for example, a fan housing. The second housing part 12 can also be comprised of two fan-housing halves similarly joined together.

The two housing parts 10 and 12 can be connected to one another in a sealing manner along a separating plane 18. See FIG. 4. For this purpose, a first border or periphery 20, 22 of the first housing part 10 and a second border or periphery 20, 22 of the second housing part 12 have abutment surfaces 24, 25 that sealingly abut one another when the first and second housing parts 10 and 12 are assembled.

Figure 2:
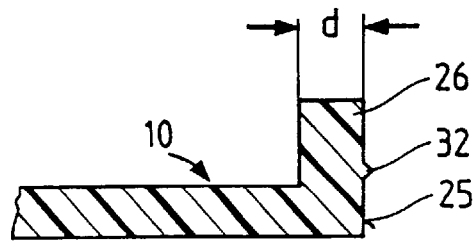
FIG. 2 shows a cross section taken along line II—II of FIG. 1.
Figure 3:
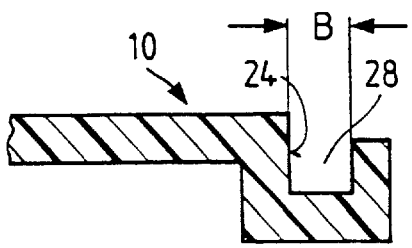
FIG. 3 shows a cross section taken along line III—III of FIG. 1.
Figure 4:
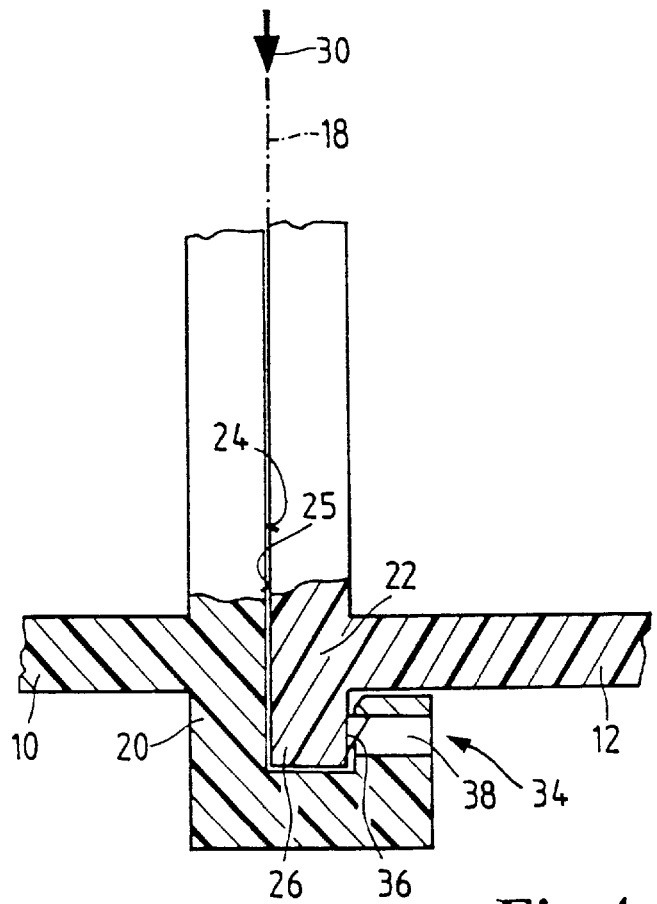
FIG. 4 shows a cross section taken along line IV—IV of FIG. 1, illustrating the first housing part sealingly connected to a second housing part.

The first housing border configuration and the second housing border configuration are substantially similar or identical. In a first sub-region, which corresponds to approximately the top half of the first housing part 10 (FIG. 1), the first periphery 22 has a first attaching member comprising an outwardly extending flange or tongue 26 (FIG. 2) of a tongue and groove connection (FIG. 4). In the remaining sub-region (bottom portion) of the first housing part 10 (FIG. 1), the second periphery 20 has a second attaching member comprising a groove or recess 28 that receives the tongue 26. Similarly, the second housing part 12 can have its upper portion with a third attaching member comprising the groove 28 and its lower portion with a fourth attaching member comprising the tongue 26 so that the borders of the first and second housing parts are complementary with each other. The two housing parts 10 and 12 are connected together by displacing or sliding linearly with respect to one another along the separating plane 18 in one direction 30. The two housing parts 10, 12 can be assembled by sliding so that the upper tongue 26 of the first housing part 10 is inserted in the upper groove 28 of the second housing part 12 and the lower tongue 26 of the second housing part 12 is inserted into the lower groove 28 of the first housing part 10. The direction of the groove depth is located along the separating plane 18.

The thickness d of the tongue 26 of one housing part 10 or 12 is dimensioned to fit (with interference) in the width B of the groove 28 of the other housing part 12 or 10 so that they are joined together with their abutment surfaces 24 and 25 sealingly abutting against one another.

The transition from the groove 28 to the tongue 26 (FIG. 1) is preferably not located in the region where the housing-part halves 14 and 16 (FIG. 1) of the first housing part 10 or the second housing part 12 border to ensure an optimum sealing function along the housing border 20, 22.

To reduce friction occurring between the abutment surfaces 24 and 25 when the housing parts 10 and 12 are in the process of being connected together, and to enhance seal of the connection, the tongue 26 (FIG. 2) can be provided with a web-like elevation or protrusion 32 extending perpendicularly to the pushing direction 30.

The groove 28 and the tongue 26 preferably have a slight wedge configuration in the displacement direction 30 so that the width B of the groove 28 decreases slightly in the push-in direction 30 and the thickness d of the tongue likewise decreases correspondingly in the push-in direction 30 so that the housing parts 10, 12 are sealingly connected when the tongue 26 is fully pushed into the groove 28. The tongues 26 of the housing parts 10 and 12 are seated in a precisely fitting manner in the grooves 28 of the housing parts 10 and 12.

A latching device 34 is provided to prevent the connected housing parts 10 and 12 from displacing relative to each other counter to the displacement direction 30 (FIG. 4). The latching device 34 can comprise latching lugs 36 arranged on the tongue 26 and latching openings 38 formed in the groove 28. When the tongue 26 is fully pushed into the groove 28, the latching lugs 36 project into the openings 38.

Of course, other latching designs can be used. For example, a latching bracket can be arranged on one of the housing parts 10 or 12 to engage over the connected housing parts 10 and 12 in a latching manner.

Thus, according to the invention, housing-part borders can be sealingly connected to one another with simple attaching members. To connect the housing parts, they can be displaced linearly relative to one another in a direction along the separating plane. This makes it possible to achieve a sealed connection of the housing part, which can be produced by a straightforward displacement action of the housing parts with respect to one another. The configuration according to the invention can considerably shorten the assembly time since no individual clips need to be clipped onto the housing parts. All that is required is for the two housing parts to be assembled is to displace the two parts with respect to one another. Thus, time and material can be saved since the conventional clips are dispensed with, to enable a more cost-effective housing assembly of a heating or air-conditioning system. The housing parts can be more easily taken apart, for example for repair purposes, since they can be separated by straightforward displacement action.

The sealing connection is formed by a groove/tongue connection, the direction of the groove depth being located in the separating plane so that it is not possible for the connected housing parts to be separated merely by a tensile loading.

The two housing-part borders can both have a groove and a tongue along its border so that the two housing-part borders are designed to correspond to one another, the groove and the tongue of a housing-part border preferably each extending over less than half of the circumference of the housing-part border.

To prevent the two housing parts from undesirably displacing along the separating plane, latching means can be provided. For instance, the tongue received in the groove can be latched together.

Although references are made to directions in describing the structure, they are made relative to the drawings (as normally viewed) for convenience. The directions, such as upper and lower, are not intended to be taken literally or limit the present invention.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

I claim:

1. A housing of a heating or air-conditioning system of a motor vehicle, comprising:

a first heating or air-conditioning housing part for housing the heating or air-conditioning system of the motor vehicle, the first housing having a first attaching member along a first portion of a periphery thereof and a second attaching member along a second portion of the periphery thereof;

a second heating or air-conditioning housing part for housing the heating or air-conditioning system, the second housing having a third attaching member along a third portion of periphery thereof and a fourth attaching member along a fourth portion of the periphery thereof, wherein the peripheries of the first and second housing parts are sealingly connected to one another along a plane that separates the first and second housing parts, the first attaching member attaching to the third attaching member and the second attaching member attaching to the fourth attaching member by displacing the first and second housing parts linearly along the separating plane.

2. A housing according to claim 1, wherein the first and fourth attaching members each comprise a tongue and the second and third attaching members each comprise a groove to form at least two opposing tongue and groove connections.

3. A housing according to claim 2, wherein the grooves are formed along the separating plane.

4. A housing according to claim 3, wherein the tongue and groove of each of the first and second housing parts extends less than half of the periphery thereof.

5. A housing according to claim 1, further including latches that prevent the first and second housing parts from displacing along the separating plane.

6. A housing according to claim 5, wherein the latches are provided on the first, second, third, and fourth attaching members.

7. A housing according to claim 6, wherein each of the latches comprises a latching lug formed on one of the first and third attaching members and one of the second and fourth attaching members, and a latching opening formed in the other of the first and third attaching members and the other of the second and fourth attaching members.

8. A housing according to claim 7, wherein the first and fourth attaching members each comprises a tongue and the second and third attaching members each comprise a groove.

9. A housing according to claim 8, wherein the groove has the latching openings and the tongue has the latching lugs.

10. A method of assembling a housing of a heating or air-conditioning system of a motor vehicle, comprising:

providing a first housing part for housing the heating or air-conditioning system of the motor vehicle, the first housing having a first attaching member along a first portion of a periphery thereof and a second attaching member along a second portion of the periphery thereof;

providing a second housing part for housing a fan for the heating or air-conditioning system, the second housing having a third attaching member along a third portion of periphery thereof and a fourth attaching member along a fourth portion of the periphery thereof, sealingly connecting the first and second housing parts to one another along a plane that separates the first and second housing parts by displacing the first and second housing parts linearly along the separating plane and attaching the first attaching member to the third attaching member and the second attaching member to the fourth attaching member.

11. A method according to claim 10, wherein the first and fourth attaching members each comprise a tongue and the second and third attaching members each comprise a groove to form at least two opposing tongue and groove connections.

12. A method according to claim 11, wherein the grooves are formed along the separating plane.

13. A method according to claim 12, wherein the groove and the tongue of each of the first and second housing parts extends less than half of the periphery thereof.

14. A method according to claim 10, further including latching the first and second housing parts together with latches and prevent the first and second housing parts from displacing relative to one another along the separating plane.

15. A method according to claim 14, wherein the latches are provided on the first, second, third, and fourth attaching members.

16. A method according to claim 15, wherein each of the latches comprises a latching lug formed on one of the first and third attaching members and one of the second and fourth attaching members, and a latching opening formed in the other of the first and third attaching members and the other of the second and fourth attaching members.

17. A method according to claim 15, wherein the first and fourth attaching members each comprises a tongue and the second and third attaching members each comprise a groove.

18. A method according to claim 17, wherein the groove has the latching openings and the tongue has the latching lugs.

19. A heating or air-conditioning system of a motor vehicle having a housing that houses the heating or air-conditioning system, the housing comprising:

a first housing part having a first attaching member along a first portion of a periphery thereof and a second attaching member along a second portion of the periphery thereof;

a second housing part having a third attaching member along a third portion of periphery thereof and a fourth attaching member along a fourth portion of the periphery thereof, wherein the peripheries of the first and second housing parts are sealingly connected to one another along a plane that separates the first and second housing parts, the first attaching member attaching to the third attaching member and the second attaching member attaching to the fourth attaching member by displacing the first and second housing parts linearly along the separating plane.

* * * * *